United States Patent Office 2,810,704
Patented Oct. 22, 1957

2,810,704

PROCESS FOR MAKING MOISTURE-UNSTABLE METHYL METHOXYPOLYSILOXANE

Karl W. Krantz, Schenectady, N. Y., assignor to General Electric Company, a corporation of New York No Drawing. Application April 19, 1954,
Serial No. 424,255

2 Claims. (Cl. 260—33.6)

This invention is concerned with novel silicone water-repellent compositions. More particularly, the invention relates to certain moisture-unstable methyl methoxypolysiloxanes having the formula I $\qquad CH_3Si(OCH_3)_nO_{\left(\frac{3-n}{2}\right)}$ where $n$ has a value equal to from 1/3 to 0.7, said compositions being eminently suitable for rendering masonry water-repellent, and methods for preparing the same.

The use of certain organopolysiloxanes for rendering masonry water-repellent is disclosed in U. S. Patent 2,574,168, Brick, issued November 6, 1951. The examples of silicone resins described in this patent used for rendering porous masonry water-repellent are generally obtained by cohydrolyzing mixtures of hydrolyzable organosilanes to give silicone resins which are capable of being cross-linked as a result of a suitable organic-to-silicon ratio. Thus, this patent describes cohydrolyzing dimethyldichlorosilane and methyltrichlorosilane, employing the latter two ingredients in such a ratio that the hydrolysis product, namely, the methylpolysiloxane, will have a ratio of from about 1.2 to 1.7 methyl groups per silicon atom, thus yielding resins capable of being converted to the insoluble state. In general, the resins used for the purposes described in this patent prior to application to the masonry are substantially free of any silicon-bonded hydrolyzable groups, for instance, the silicon-bonded chlorine atoms. Moreover, these organopolysiloxane resins after application to the masonry are free of groups other than the silicon-bonded organic radicals attached to silicon by carbon-silicon linkages, oxygen atoms, and silicon atoms, as evidenced by the disclosures and teachings in this patent that the completely condensed silicone resin has a formula $(R_nSiO_m)_x$ where $x$ is an integer greater than 1, R represents certain monovalent hydrocarbon radicals, $m$ is a number between 0.5 and 2, and $n$ is a number between 1 and 1.75. Although these particular types of silicone resins employed for water-proofing masonry have found wide use, there are certain disadvantages which have arisen in connection with the preparation and uses of the latter.

It has generally come to be expected that in making these silicone resins, the trihydrolyzable organosilane, for instance, methyltrichlorosilane, used for the purpose, must be cohydrolyzed with a dihydrolyzable diorganosilane, such as dimethyldichlorosilane. Although both these types of difunctional and trifunctional organohydrolyzable silanes are readily available, nevertheless, in the manufacture of these hydrolyzable silanes, particularly the methylchlorosilanes, employing the direct process described in U. S. Patent 2,380,995, issued August 7, 1945, large amounts of methyltrichlorosilane are obtained as a result of practicing this direct process by passing organic halides, such as methyl chloride, over heated silicon, usually in the presence of a catalyst such as copper. Unfortunately, the amount of methyltrichlorosilane produced has been found to be considerably in excess of that required for its primary application, namely, in the manufacture of organopolysiloxane resins. The resins described in the aforementioned U. S. Patent 2,574,168 apparently do not encompass using methyltrichlorosilanes alone in making these resins and, accordingly, maximum utilization of the methyltrichlorosilane output is not realized in making the resins employed in the practice of the aforesaid patent.

In addition, the particular resins embraced by U. S. Patent 2,574,168, although convertible to the insoluble and cured state, often require long periods of time before such state may be satisfactorily attained. It is, therefore, apparent that in some applications requiring an accelerated drying and curing of the resin, organopolysiloxane resins free of groups other than silicon-bonded organic radicals, and the silicon and oxygen atoms of the siloxane linkages, may be unsatisfactory.

Unexpectedly, I have discovered that a certain type of methylpolysiloxane resin of critical composition and derived by means of a critical method of preparation is eminently suitable for rendering porous masonry water-repellent. In addition, I have also found that I can employ substantially pure methyltrichlorosilane as the starting ingredient in making these resins without the necessity of any other functional cohydrolyzable methylchlorosilanes, such as dimethyldichlorosilane, and that these specific types of methylpolysiloxane resins cure rapidly after application to the masonry in relatively short periods of time even without the presence of driers commonly employed as cure accelerators in combination with methylpolysiloxane resins.

In accordance with my invention, I prepare a methylpolysiloxane resin having silicon-bonded methoxy groups of the formula $$CH_3Si(OCH_3)_nO_{\left(\frac{3-n}{2}\right)}$$

where $n$ has the value of from 1/3 to 0.7. I have found that if $n$ has a value below 1/3, or above 0.7, certain processing difficulties are encounteerd which either render it impossible to isolate a usable product, or else increased difficulty and expense are encountered in isolating the desirable product.

Thus, it has been found that if one employs the starting ingredients designed to give a methylpolysiloxane resin of the type described above (Formula I) where $n$ is less than 1/3, the resin tends to gel during the preparation thereof. Although this gelling can be minimized by employing large amounts of inert solvents used in the preparation of the resin, such procedures are undesirable because the product isolated fails to impart water repellency while the use of excess solvent additionally prevents phase separation during the resin preparation necessary for obtaining the desired product with a minimum of isolation processing. Again, if the amount of intermediate ingredients is such that $n$ in the aforesaid methylpolysiloxane resin formula has a value above 0.7, then the molecular weight of the obtained resin is too low and again the desired phase separation is not attained because of the solubility of these low molecular weight products in the methanol (used both as reactant and solvent) employed in making such resins. Moreover, difficulty is encountered in isolating any desirable product, and any product which is obtained may be too volatile for economical and practical application, or is unable to impart satisfactory water repellency to the masonry.

The methyl methoxypolysiloxanes (for brevity hereinafter referred to as "methylpolysiloxane resins") herein described and claimed differ from those recited in U. S. Patent 2,624,749-Bunnell in various ways. Whereas the compositions of the latter patent are stated to be stable in the presence of water or hydrogen halide, such as hydrogen chloride, my compositions are extremely unstable in the presence of moisture and even more unstable in the presence of hydrogen halide and rapidly convert to the cured, insoluble state in contrast to the essentially unchanged state of the organopolysiloxanes described by the patentee. Thus, if one employs test conditions recited in columns 16 and 17 of the aforesaid Bunnell patent, in combination with my methyl methoxypolysiloxanes, whereas the patentee's materials are stated to be essentially unchanged after 30 days, my compositions are so unstable that they would gel within 24 hours or less as soon as the solvent for the latter has evaporated. Even more rapid gellation would occur in the presence of hydrogen halide fumes.

The reasons for the differences between my methyl methoxypolysiloxanes and the stable polymers described in U. S. Patent 2,624,749 are due to the method whereby the respective materials are prepared, especially in view of the teachings embodied in his specific examples for making Bunnell's compositions. Such critical differences of preparation will be apparent from a comparison of the following method required for preparing my claimed compositions with the method for preparing the stable polymers recited in the latter patent.

The method whereby the above-identified methylpolysiloxane may be prepared is as follows. A solution of methyltrichlorosilane in a suitable solvent, e. g., a suitable aromatic hydrocarbon solvent, is prepared. Generally, it is desired to employ essentially pure methyltrichlorosilane. However, small amounts of up to 5%, by weight, dimethyldichlorosilane, up to 5% silicon tetrachloride, or up to 0.5% trimethylchlorosilane, based on the weight of the methyltrichlorosilane, may be tolerated without harmful effect. Thereafter, methanol is added to the solution of methyltrichlorosilane in an amount equal to at least one mole of the former per mole of the methyltrichlorosilanes whereby at least part of the silicon-bonded chlorine atoms are replaced by methoxy groups, with the evolution of HCl. The partial reaction mixture is then further reacted with a solution of methyl alcohol in water, after which there will be obtained a two-phase separation, the lower phase being the crude methyl methoxypolysiloxane containing most of the hydrocarbon solvent, and the upper layer being essentially methyl alcohol saturated with hydrogen chloride. The lower layer is thereafter separated, washed with an additional amount of methyl alcohol, and neutralized, for instance, with calcium carbonate to neutralize any residual HCl present therein. The reaction product is advantageously heated to a temperature of, for instance, about 40°–60° C. under vacuum, for instance, at reduced pressure of about 25 to 75 mm. Hg to remove most of the unreacted methanol and thus to raise the flash point of the resin solution, which is desirable in order to minimize fire hazards during use or during transportation. Such removal of methanol by stripping is not required, however, to obtain an otherwise satisfactory product capable of imparting high water repellency on masonry. Advantageously, the solids content of the methyl methoxypolysiloxane is adjusted with additional solvent to about 50 to 75% solids.

In preparing the solution of the methyltrichlorosilane with the suitable solvent, it is advantageous to employ on a weight basis from 0.1 to 0.3 part of the solvent per part of the methyltrichlorosilane. The solvent used in making this methyltrichlorosilane blend or solution is critical. Substantially aromatic hydrocarbons are the preferred solvents because they have a higher density than aliphatic hydrocarbons, and this higher density favors easier separation of the phases which is essential to economical operation of the process. Moreover, with some aliphatic solvents there is incomplete miscibility of the solvent with the methyl methoxypolysiloxane under reaction conditions. While aromatic hydrocarbons are preferred, other solvents capable of giving the desired separation of phases encountered in the processing of the resin, and inert toward methylchlorosilanes and hydrogen chloride, may be employed, as for example, trichloroethylene, carbon tetrachloride, or other suitable chlorinated hydrocarbon solvents. In order to minimize fire hazards in transportation and use, it is desirable that the final product have a flash point exceeding 30° C. The boiling range of the preferred aromatic hydrocarbon solvent is chosen to provide a flash point above 30° C., but at the same time to insure that, after application of the methyl methoxypolysiloxane solution to the masonry, the solvent will readily evaporate and thus cause rapid cure of the methyl methoxypolysiloxane resin. The preferred boiling range of such solvents is about 140° C. to 190° C.

Among the aromatic solvents which may be employed with the methyltrichlorosilane (which solvent can later become at least part of the solvent for the methylpolysiloxane solution) may be mentioned, for example, benzene, toluene, xylene, various other alkylated benzenes such as ethylbenzene, hydrogenated naphthalene, etc. A group of solvents which has been found eminently suitable for the purpose are mixtures of alkylated aromatic hydrocarbons obtained by the cracking and hydroforming and subsequent distillation of light petroleum oils, particularly mixtures of alkylated benzenes, sold under the name of the Solvessos, and more particularly described in the booklet entitled "Esso Petroleum Solvents" published by Esso Standard Oil Company (1951). A typical Solvesso hydrocarbon fraction is Solvesso 100, which has the following average composition:

|  | Percent |
|---|---|
| m-Xylene | 3 |
| o-Xylene | 6 |
| Isopropylbenzene | 3 |
| 1-methyl-3-ethylbenzene | 20 |
| 1-methyl-4-ethylbenzene | 8 |
| 1,3,5-trimethylbenzene | 7 |
| 1-methyl-2-ethylbenzene | 8 |
| 1,2,4-trimethylbenzene | 27 |
| 1,2,3-trimethylbenzene | 5 |
| Other monoalkyl benzenes | 13 |

Other solvents which may be employed are, for instance, those entitled "Hi Flash Naphtha" which is a mixture of alkylated aromatic hydrocarbons obtained from coal tar. Generally, the boiling point of such fractions will range from about 135° to 195° C., depending upon the cut taken during distillation. Thus, one such fraction may have a boiling range of 140° to 180° C., while another fraction may have a boiling range of about 150° to 175° C. A typical analysis of Hi Flash Naphtha comprises the following ingredients in stipulated percents, by weight:

|  | Percent |
|---|---|
| Ethylbenzene, xylene, cumene, propylbenzene, ethyltoluene | 10 |
| Trimethylbenzene | 45 |
| Tetramethylbenzene | 40 |
| Naphthalene | 5 |

Examples of alkylated aromatic compounds derived from the distillation of light petroleum oils are the aforesaid liquids identified as Solvessos, which have boiling point ranges somewhere between approximately 94° C. to 240° C., and Solvent Naphtha, which is a narrow cut boiling between about 135° C. to 155° C. Additional descriptions of the above-described mixtures of liquid alkylated aromatic hydrocarbons useful in the practice of the present invention may be found in the book Industrial Solvents by Ibert Mellan, published by Reinhold Publishing Corp. (1939) and in the book Protective and Decorative Coatings edited by Joseph J. Mattiello, chap. 14B, page 180, and published by United States Printing Office (1945).

After having formed to blend comprising the solution of the methyltrichlorosilane and the aromatic hydrocarbon solvent, methyl alcohol is added in such an amount that it is available both as a reactant with the methyltrichlorosilane, and also as a diluent for the subsequent water hydrolysis in order to prevent gelation. In adding the methanol, the latter is advantageously incorporated in two steps. If all the alcohol required in the reaction is added at one time, and the methanol:aromatic hydrocarbon solution of the resulting methoxylated product is caused to react with the undiluted water of hydrolysis, gelation of the mixture will occur, so that an unusable product is obtained. This is usually the case when working with methyltrichlorosilane. In order to avoid this, the amount of methanol added is divided in two portions.

In general, the total amount of methanol used in the entire reaction is equal in amount to from 1 to 3 or more moles (3 moles is usually sufficient) of the latter per mole of methyltrichlorosilane present in the blend. Generally, I have found that it is advantageous to add in the first stage, from 25 to 75% of the total weight of the methanol to be employed in the reaction. Optimum results are obtained when about 35 to 60% of the total amount of methanol to be used is added in the first step. It will be found as the first step methanol is added, that the temperature of the reaction mixture will be depressed and may go as low as $-10°$ C. and that hydrogen chloride will be evolved, leaving some hydrogen chloride dissolved in the reaction mixture (about 10% of the theoretical). Agitation is advantageously employed in order to effect intimate reaction between the ingredients to form the methoxylated methylsilane. Thereafter, the balance of the methanol mixed with water is added to the methoxylated methylsilane mixture, the amount of water used being sufficient to yield the desired methoxy content of the resin between $\frac{1}{3}$ to 0.7.

This proportion of water of hydrolysis is critical and, if too much water is added, the reaction mixture will gel, while if insufficient water is added, the water repellency of the formed product will be inferior and of little use. In addition, insufficient amounts of water will have a serious effect on phase separation, preventing satisfactory isolation of the desired methyl methoxypolysiloxane. In general, I have found that the amount of water used on a weight basis should range from about 0.145 to 0.155 part thereof per part of methyltrichlorosilane initially employed. Stated alternatively, it is essential that one employ about 1.15 to 1.33 moles of water per mole of methyltrichlorosilane initially employed. Again, upon addition of the water-methanol mixture, it will be found that the temperature will first fall to as low as $-15$ to $-20°$ C., and then rise to a temperature of the order of about 25 to 30° C. with further evolution of HCl gas. During this period the dissolved HCl in the mixture of ingredients will cause condensation of the resin to the desired degree. If the agitated mixture is then permitted to remain undisturbed, it will readily separate into two phases, the lower layer being the crude methyl methoxypolysiloxane containing most of the inert solvent and the upper layer comprising essentially methanol saturated with hydrogen chloride.

The lower resin layer is then separated, washed with an additional amount of methyl alcohol (which alcohol is now immiscible with the methylpolysiloxane solution in the aromatic hydrocarbon), and a neutralizing agent such as calcium carbonate (to which neutral filter aids may be added) is incorporated in the separated lower resin layer to neutralize any residual HCl present. Thereafter, advantageously the solution of the methylpolysiloxane resin with suspended solids is subjected to moderate heating at reduced pressure in order to remove any traces of methanol and to raise the flash point which may have been depressed by the presence of small amounts of methanol. The temperature should not be so high that any substantial amounts of inert solvent are removed. Thereafter, the resin solution may be filtered and adjusted to any solids content with additional solvent, preferably within the range of about 50 to 75% resin solids.

Alternatively, the suspended solids including excess calcium carbonate may be filtered prior to the stripping operation. However, the order first given has two advantages: first, the additional stirring and heating in the presence of calcium carbonate favors more complete and positive neutralization of residual HCl, and second, such heating tends to coagulate the solids and promotes ease of filtration thereof.

When employing a methyl methoxypolysiloxane of the instant invention for waterproofing masonry, it is usually desirable to cut back the solution to a solids content of about 0.5 to 8% of methyl methoxypolysiloxane. If catalysts to accelerate the cure of the resin are employed, they should be incorporated immediately prior to use of the resin, in order to maintain the shelf life of the resin for a usable length of time. However, catalysts are generally not necessary, since my resins will dry rapidly, and within 24 hours will have reached a highly water-repellent condensed state, in which there are present not only the silicon-bonded methyl groups, but also a substantial amount of silicon-bonded methoxy radicals. The presence of silicon-bonded methoxy groups represents a marked distinction in the compositions herein employed for waterproofing purposes as compared to the silicone resins described in the aforesaid Brick patent where the completely condensed resin has all the organic groups attached to silicon by carbon-silicon linkages.

After obtaining the methyl methoxypolysiloxane resin solution in dilute form, the resin solution is applied to the masonry by any suitable means, for instance, by spraying, painting, dipping, wiping, etc., usually employed in treating various kinds of masonry to render the latter water-repellent. After application of the resin solution to the particular masonry, it is only necessary to permit it to dry in air whereby the solvent is evaporated, after which the resin rapidly condenses to the substantially completely condensed state, in which optimum water-repellent properties are obtained. Among the various masonries which may be treated with the above-described methyl methoxypolysilane may be mentioned, for instance, all inorganic non-metallic materials which are porous to water, such as asbestos shingles, asbestos board, brick, concrete, mortar, stone, stucco, and the like.

In order that those skilled in the art may better understand how the present invention may be practiced, the following example is given by way of illustration and not by way of limitation. All parts are by weight.

EXAMPLE 1

A blend was prepared by dissolving 100 parts methyltrichlorosilane in 20 parts of the above-described Solvesso 100. About 28 parts methanol were intimately mixed with the aforesaid blend in order to replace part of the silicon-bonded chlorines with methoxy groups, during which time the temperature dropped to about $-10°$ C. while at the same time hydrogen chloride was evolved from the reaction mixture, leaving about 10% HCl dissolved in the reaction mixture. Thereafter, a mixture of 18.6 parts methyl alcohol and 15 parts water was added and intimately mixed with the latter reaction product. The temperature fell further to about $-15$ to $-20°$ C. and then rose to about 30° C. As a result of the last addition of the methanol and water, there was obtained a two-phase mixture in which the lower phase was the desired curable, moisture unstable, methyl methoxypolysiloxane, while the upper layer comprised essentially methyl alcohol saturated with hydrogen chloride. The lower resin layer (which amounted to about 60 parts) comprising the methyl methoxypolysiloxane dissolved in the mixture of alkylated aromatic hydrocarbons was separated, about 2 parts calcium carbonate added thereto, in order to neutralize any residual HCl, and the entire mixture vacuum-stripped at a temperature of about 60° C. at 50 mm. to remove any residual methyl alcohol. There was thus obtained a methyl methoxypolysiloxane having the following formula: $CH_3SiO_{1.3}(OCH_3)_{0.4}$ in about a 70% solids solution. This methyl methoxypolysiloxane was unstable in the presence of moisture as evidenced by the fact that after evaporation of the solvent, when mixed with water, and allowed to stand, it gelled within a few hours. Also, this material if allowed to stand in the presence of hydrogen chloride will again gel in even less time than it gelled when moisture was present.

EXAMPLE 2

This example illustrates the effect of treating a certain masonry, namely, common building brick, with the above prepared methyl methoxypolysiloxane, employing the methyl methoxypolysiloxane in the form of diluted xylene solutions in which the concentration of the methyl methoxypolysiloxane was varied from about 0.5% to 4% solids. In carrying out these tests, common bricks were dipped in the respective solution of the methyl methoxypolysiloxane for varying lengths of time, the bricks removed and thereafter allowed to remain at room temperature in still air for 24 hours. At the end of this time each test brick was immersed on one of its two larger area flat sides in ¼" of water and the amount of moisture absorbed determined after 21 days' immersion in the water. The following Table I shows the results of tests conducted on the various treated bricks. The table also includes test results on a control brick which was not treated with the methyl methoxypolysiloxane but was subjected to the same water absorption test.

Table I

| Percent Methyl Methoxypolysiloxane | Number Seconds In Resin Solution | Percent Water Absorption |
|---|---|---|
| None—control | | 15–20 |
| 0.5% | 30 | 1.3 |
|  | 15 | 1.6 |
| 1.0% | 30 | 1.0 |
|  | 20 | 0.17 |
|  | 15 | 0.14 |
|  | 10 | 0.50 |
| 2.0% | 30 | 0.04 |
|  | 20 | 0.06 |
|  | 15 | 0.08 |
|  | 10 | 0.04 |
| 4.0% | 30 | 0.07 |
|  | 20 | 0.08 |
|  | 15 | 0.02 |
|  | 10 | 0.02 |

In order to compare the above results with the results obtained by other commercially available organopolysiloxanes for treating masonry, two silicone products intended for this purpose were used in tests similar to those described above. One product comprised a methylpolysiloxane solution (in xylene) containing both Si-O-Si linkages as well as Si-Si linkages, and the organic groups attached to silicon were essentially all methyl groups (identified as "methylpolysilane resin"). Another product tested comprised a lower alkyl polysiloxane in which the alkyl groups are believed to be ethyl groups attached to silicon by carbon-silicon linkages, and in addition containing silicon-bonded ethoxy groups (identified as "ethoxypolysiloxane resin"). The above two resinous compositions were diluted with xylene in various concentrations, and bricks were dipped in these resins in their entirety and thereafter allowed to remain in still air for 24 hours, after which time they were immersed in water in the same manner as described above and allowed to remain in this water for varying lengths of time, after which the percent moisture pickup was calculated. The following Table II shows the results of these various tests. In this table some of the test conditions were varied as described.

Table II

| Percent Resin in Treating Solution | Number Seconds in Resin Solution | Percent Water Absorption In Days |
|---|---|---|
| A. Methylpolysilane Resin: | | |
| 1% | 30 | 8.7%, 6 days. |
|  | 30 | 14.7%,[a] 8 days. |
|  | 15 | 15.5%,[a] 8 days. |
| 2% | 30 | 12.5%,[a] 8 days. |
|  | 20 | 12.5%,[a] 8 days. |
|  | 10 | 15.7%,[a] 8 days. |
| 4% | 20 | 0.16%, 21 days. |
|  | 15 | 0.18%, 21 days. |
|  | 10 | 0.29%, 21 days. |
| B. Ethoxypolysiloxane:[b] | | |
| 2% [c] | 15 | 3.5%, 10 days. |
| 2% [d] | 15 | 2.2%, 7 days. |
| 2% [e] | 15 | 1.1%, 19 days. |
| C. Methyl Methoxypolysiloxane (of Example 1): | | |
| 2% [c] | 15 | 0.0, 19 days. |
| 2% [d] | 15 | 0.0, 19 days. |
| 2% [e] | 15 | 0.0, 19 days. |

[a] Bricks saturated with water.
[b] Solvent was Amsco Naphthol Mineral Spirits KB.33.
[c] Treated brick cured in high humidity atmosphere (50%), forced air circulation for 4 hours.
[d] Treated brick cured in high humidity atmosphere (50%), forced air circulation for 6 hours.
[e] Treated brick cured in high humidity atmosphere (50%), forced air circulation for 8 hours.

It will be apparent from the above two tables that the methyl methoxypolysiloxane described in the present application imparts water repellency to masonry, in this case common brick, of a much higher degree than is obtainable by using two presently commercially available organopolysiloxane resins for the same purpose. It should also be noted that the improved water repellency on masonry is obtainable with much smaller amounts of the methyl methoxypolysiloxane than with either equivalent amounts of the other two organopolysiloxanes, or larger amounts of the latter organopolysiloxanes.

EXAMPLE 3

This example illustrates the water repellency obtainable with various organopolysiloxane compositions when applied to concrete surfaces. One concrete used (identified as "Concrete A") was a highly alkaline concrete of fine porosity containing red iron oxide as a pigment and being composed of a mixture of sand and mortar in a weight ratio of 1 part mortar to 2 parts sand while another concrete used (identified as "Concrete B") was a moderately alkaline concrete of coarse porosity, also pigmented with red iron oxide and being a commercial mixture of concrete and sand (about a 1 to 3 weight ratio) which had been cast into large blocks. For test purposes, the size of the samples used for dipping in the respective organopolysiloxanes were about 3" x 4" x 1". In each instance, the entire concrete sample was immersed for 5 seconds in a solution of the respective organopolysiloxane which was present, by weight, in an amount equal to about 5% solids. After removal from the organopolysiloxane solution, the concrete sample was allowed to dry in a high humidity atmosphere (50%) under forced air circulation for 24 hours, and thereafter each treated and cured sample was immersed in water for 24 hours (in the same manner as described in Example 2), after which time the percent water absorption was measured. In these tests, the organopolysiloxane resin solutions used were the same as those described in Table II of Example 2 above, namely, the methylpolysilane resin, the ethoxypolysiloxane resin, and the methyl methoxypolysiloxane resin of the instant invention. In addition, another resin was tested which was a straight methylpolysiloxane resin free of silicon-bonded alkoxy groups and containing as the sole organic groups methyl groups attached to silicon by carbon-silicon linkages. This latter methylpolysiloxane resin (so referred to in the following table) was one which is included within the scope of the above-identified Brick patent. The following Table III shows the water absorption of the various tested samples. Control samples which had not been treated with any of the resins showed moisture absorption well above 10 to 12%.

*Table III*

CONCRETE A

| Organopolysiloxane Used | Percent Water Absorption After 24 Hrs. |
|---|---|
| Methyl Methoxypolysiloxane | 1.2 |
| Methylpolysilane resin | 3.1 |
| Ethoxy polysiloxane resin | 4.9 |
| Methylpolysiloxane resin | 4.4 |

CONCRETE B

| | |
|---|---|
| Methyl Methoxypolysiloxane | 0.0 |
| Methylpolysilane resin | 0.3 |
| Ethoxy polysiloxane | 1.5 |

Tests conducted on the condensed methyl methoxypolysiloxane present on the masonry show that even after long periods of time when it would not be expected that further condensation of the methyl methoxypolysiloxane would take place, there were still present a substantial quantity of silicon-bonded methoxy groups. This should be contrasted with the completely condensed organopolysiloxanes recited in the aforesaid Brick Patent 2,574,168 which consist solely of silicon and oxygen atoms in the siloxane linkage, and silicon-bonded organic radicals, for instance, silicon-bonded alkyl and aryl radicals, attached to silicon by carbon-silicon linkages.

It will, of course, be apparent to those skilled in the art that in addition to the specific methyl methoxypolysiloxane employed in the foregoing examples, one may also use methyl methoxypolysiloxanes in which the ratio of methoxy groups to silicon and methyl groups is varied within the ranges described previously for Formula I. Such variations in the methyl methoxypolysiloxane depend, e. g., on the concentrations of the water of hydrolysis, on the amount of methanol used to effect alkoxylation of the methyltrichlorosiloxane, the rate at which the methyltrimethoxysilane is converted to the polymeric methyl methoxypolysiloxane, etc.

It will also be apparent to those skilled in the art that in addition to treating common brick, other masonries, many examples of which have been given above, may be treated in accordance with the practice of the present invention. The concentration of the methyl methoxypolysiloxane in the treating solution, the solvent, the treating conditions, etc., may also be varied widely.

Obviously, other materials incorporated in masonry treating compositions may also be used without departing from the scope of the invention. In this respect, one may add various amounts of polyethyl silicate to the methyl methoxypolysiloxane solution to effect cost reductions in the treating compositions without undesirably affecting the water repellency properties of the applied methyl methoxypolysiloxane.

What I claim as new and desire to secure by Letters Patent of the United States is:

1. The process for forming a moisture-unstable methyl methoxypolysiloxane having the formula $$CH_3Si(OCH_3)_nO_{\left(\frac{3-n}{2}\right)}$$

where $n$ has a value equal to from 1/3 to 0.7, which process comprises (a) treating methyltrichlorosilane in the absence of water and in the presence of a water-insoluble, inert solvent for the latter with methanol in an amount equal to from 1 to less than 3 moles methanol per mole of methyltrichlorosilane, the upper limit of methanol being sufficient to replace only part of the silicon-bonded chlorine atoms of the methyltrichlorosilane with methoxy groups, the by-product HCl being retained in the reaction mixture (b) hydrolyzing the mixing of ingredients of (a) with a mixture of ingredients comprising methanol and water in which the water used is present in an amount equal to from 1.15 to 1.33 moles of the latter per mole of methyltrichlorosilane originally used, there being employed in step (a) from 25 to 75% of the total amount of methanol used in steps (a) and (b), (c) permitting the hydrolysis product of (b) to condense in the presence of the hydrogen chloride dissolved in the reaction mixture, and (d) isolating the resin-containing layer from the multiphase liquid system obtained as a result of the condensation described in (c).

2. The process as in claim 1 in which the water-insoluble, inert solvent is a mixture of alkylated aromatic compounds.

References Cited in the file of this patent

UNITED STATES PATENTS

| 2,574,168 | Brick | Nov. 6, 1951 |
| 2,624,749 | Bunnell | Jan. 6, 1953 |
| 2,683,674 | Hatcher et al. | July 13, 1954 |